April 19, 1938.                B. D. BEDFORD                2,114,828
                          ELECTRIC VALVE CIRCUIT
                            Filed July 3, 1936
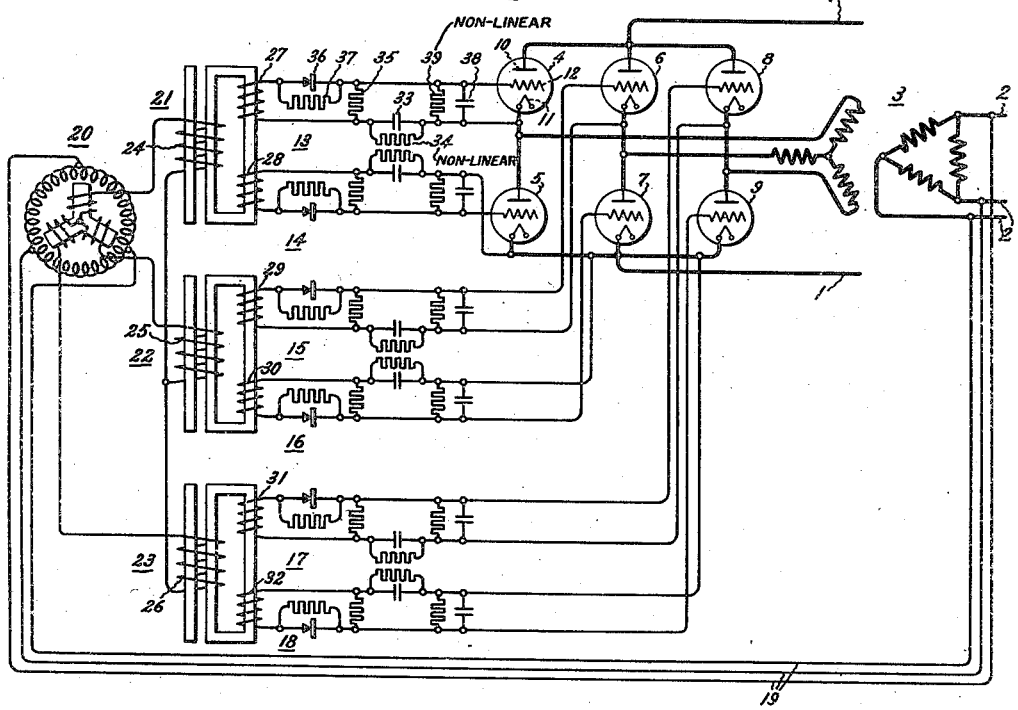
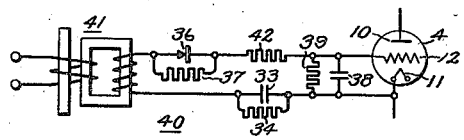
Inventor:
Burnice D. Bedford,
by Harry E. Dunham
      His Attorney.

Patented Apr. 19, 1938

2,114,828

UNITED STATES PATENT OFFICE 2,114,828

ELECTRIC VALVE CIRCUIT

Burnice D. Bedford, Schenectady, N. Y., assignor to General Electric Company, a corporation of New York Application July 3, 1936, Serial No. 88,825

9 Claims. (Cl. 175—363)

My invention relates to electric valve translating apparatus and more particularly to control or excitation circuits for electric valves.

With the increasing use of electric valve translating circuits in power transmission and distribution systems, it has become evident that there is a decided need for control apparatus capable of providing reliable and continuous service. In the control of electric valve means employing ionizable mediums, such as gases or vapors, it is highly desirable to provide circuits capable of supplying negative biasing voltages which remain substantially unaltered during abnormal operating conditions or to minimize the variation in biasing voltages in order to assure complete control of the electric valve means. Furthermore, it has been found that it is desirable to provide a control circuit which will not only maintain a negative biasing potential but will also function in a reliable manner to provide the normal control member current to render the electric valve means conductive during the proper intervals.

Many of the prior art arrangements have employed separate sources of potential, such as batteries, to provide this essential biasing voltage. These arrangements, however, under certain adverse operating conditions have failed to maintain a satisfactory biasing voltage, resulting in a loss of control and incurring an interruption of service. In those prior art arrangements which have utilized the self-biasing type of circuit, it has been shown that where the electric valve means is subjected to an arc-back condition or where the electric valve is required to conduct current for a period substantially exceeding the normal periods of conduction, the self-biasing means frequently fails to maintain a satisfactory biasing voltage. Many of the prior art self-biasing types of control circuits have utilized unidirectional conducting devices for establishing and maintaining the negative biasing potential in the control circuit. These circuits have had the inherent disadvantage of failing to maintain the negative biasing voltage when the unidirectional conducting devices arc-back or when the unidirectional conducting devices are subjected to an open circuit condition. In view of these factors, it is, therefore, highly desirable to provide a control circuit which is capable of maintaining the negative biasing voltage within a predetermined range of values and which is capable of maintaining this biasing voltage even though an element, such as the unidirectional conducting device, is subjected to an arc-back condition or an open circuit condition.

Where electric valve means of large current carrying capacity are used, such as power electric valves of the type employing ionizable mediums, it has become expedient to provide excitation circuits to maintain the negative biasing voltage within a predetermined range of values. The prior art arrangements have used means, such as glow-discharge valves, to control the negative biasing potential. Since these prior art arrangements are capable of carrying only relatively small currents, it has become important to provide other means having a larger current carrying capacity to afford the desired control.

It is an object of my invention to provide a new and improved electric valve translating circuit.

It is another object of my invention to provide a control circuit for electric valve translating apparatus which obviates the above-mentioned difficulties.

It is a further object of my invention to provide a control circuit of the self-biasing type for electric valve means which maintains a sufficient negative biasing potential under adverse operating conditions of the electric valve means.

It is a still further object of my invention to provide a control circuit of the self-biasing type for electric valve means which maintains a satisfactory biasing voltage in the event of a failure of one or more elements of the control circuit and which provides satisfactory control of the electric valve means under such conditions.

In accordance with the illustrated embodiment of my invention, I provide a control or excitation circuit of the self-biasing type for electric valve means employing ionizable mediums such as gases or vapors. A self-biasing capacitance is charged from a suitable source of alternating potential, preferably of peaked wave form, through a unidirectional conducting device. An impedance element having a non-linear negative impedance-current characteristic is connected across the capacitance to limit the maximum value of the negative biasing potential or to minimize the variations in the biasing potential introduced in the control circuit. In order to assure the maintenance of this negative biasing potential in the event the unidirectional conducting device is subjected to an open circuit condition, the unidirectional conducting device is shunted by a non-inductive impedance. The value of this impedance is chosen so that the impedance to the normal control member current is not excessive, permitting thereby the associated main electric valve means to be rendered conductive by the passage of current through the non-inductive impedance. In accordance with another embodiment of my invention, I provide an excitation circuit of the self-biasing type in which a biasing capacitance is energized through a unidirectional conducting device. An impedance element is connected in series relation with the unidirectional conducting device, the capacitance, and the control member of the associated electric valve to limit the current in the excitation circuit in the event the unidirectional conducting device conducts current in the reverse direction or becomes subjected to a short circuit condition.

For a better understanding of my invention, reference may be had to the following description taken in connection with the accompanying drawing and its scope will be pointed out in the appended claims. Fig. 1 of the drawing diagrammatically represents an embodiment of my invention as applied to an electric valve translating circuit, and Fig. 2 diagrammatically shows a simplified and modified arrangement of the excitation circuit shown in Fig. 1.

In Fig. 1 of the accompanying drawing, I have diagrammatically shown my invention as applied to an electric valve translating circuit for transmitting energy between a direct current circuit 1 and a polyphase alternating current circuit 2. A transformer 3 and an electric valve aggregate, including electric valves 4—9, are employed to interconnect the direct current circuit 1 and the alternating current circuit 2. The electric valves 4—9, inclusive, each includes an anode 10, a cathode 11 and a control member 12 and each employs an ionizable medium, such as a gas or vapor, providing an arc discharge path.

In order to control the conductivity of electric valves 4—9, inclusive, I provide control or excitation circuits 13—18, respectively. These excitation circuits may be energized from any suitable source of alternating potential and for the purpose of explaining my invention I have shown these excitation circuits as being energized from the alternating current circuit 2 through conductors 19 and any conventional phase shifting arrangement, such as a rotary phase shifter 20. The rotary phase shifter 20 may be manually or automatically operated. Transformers 21, 22 and 23 having primary windings 24, 25 and 26 and secondary windings 27 and 28, 29 and 30, and 31 and 32 energize excitation circuits 13—18. Transformers 21—23 are preferably of the type designed to furnish a voltage of peaked wave form.

To facilitate the description of the excitation circuits 13—18, which are of the self-biasing type, excitation circuit 13, which is associated with electric valve 4, will be considered in particular. The secondary winding 27 of transformer 21 impresses on the excitation circuit 13 a voltage of peaked wave form. A capacitance 33 is connected in series relation with the secondary winding 27 and control member 12 and cathode 11 of electric valve 4 and serves as a self-biasing means to impress on the control member 12 a negative biasing potential. To limit the magnitude of the negative biasing potential, I provide an impedance element 34 connected across the capacitance 33. This impedance element is preferably of the type having a negative non-linear impedance-current characteristic and may be of the material disclosed and claimed in U. S. Patent No. 1,822,742 granted September 8, 1931, on an application of K. B. McEachron and assigned to the assignee of the present application. The capacitance 33 impresses the negative biasing potential on the control member 12 through a suitable impedance element 35 which is connected in series relation with the capacitance 33 and control member 12 and cathode 11 of electric valve 4.

As a means for providing a relatively low impedance path for the normal control member current, a unidirectional conducting device 36 is connected in series relation with the capacitance 33, secondary winding 27 of transformer 21 and control member 12 and cathode 11 of electric valve 4. In order to provide a path for the normal control member current in the event the unidirectional conducting device 36 becomes inoperative due to an arc-back condition or an open circuit condition, a non-inductive path including a symmetrically conductive impedance element 37 is connected in parallel with the unidirectional conducting device 36. This impedance element cooperating with the unidirectional conducting device 36 provides an arrangement in which a relatively low impedance is offered to the normal control member current but which offers a relatively large impedance to the flow of the so-called "positive ion current" which tends to flow in an opposite direction in the control circuit due to the deionization of the medium employed in electric valve 4.

To suppress high voltage transients which may be present in the excitation circuit 13, I employ a capacitance 38 and a resistance 39 connected across control member 12 and cathode 11 of electric valve 4. The resistance 39 may be of the type having a non-linear impedance-current characteristic.

The general principles of operation of the embodiment of my invention diagrammatically shown in the single figure of the drawing may be best explained by considering the electric valve translating circuit when energy is being transmitted from the direct current circuit 1 to the alternating current circuit 2. As will be well understood by those skilled in the art, the electric valves 4—9 will conduct current in a predetermined order and for predetermined intervals. Each electric valve conducts current for substantially 120 electrical degrees during each cycle of alternating potential but each valve conducts current only 60 electrical degrees through any one of the oppositely disposed electric valves. In electric valve translating circuits of this type, where the electric valve means is operated as an inverter, it is essential that the control or excitation circuits for energizing the control members supply suitable currents and voltages for rendering the electric valves conductive in a positive and reliable manner. In addition, it is essential in order to maintain this control that the control circuits maintain a negative biasing potential within a predetermined range of values so that the mediums will be deionized when the electric valves have completed the normal periods of conduction. In this manner, the electric valve means are restored to a condition in which the control members may regain control.

If it be assumed that during positive half cycles the potential of the upper terminal of the secondary winding 27 of transformer 21 is positive relative to the lower terminal, a normal control member current will flow in the excitation circuit rendering the electric valve 4 conductive. The circuit through which this current flows includes unidirectional conducting device 36, control member 12 and cathode 11 of electric valve 4, capacitance 33 and secondary winding 27. This normal control member current establishes a negative charge on the left-hand plate of capacitance 33 and by virtue of this charge a negative biasing potential is established in the excitation circuit 13. The negative biasing potential is impressed on the control member 12 through the impedance element 35 or through winding 27 and resistance 37. After the electric valve 4 has completed its normal period of conduction and the current has been commutated to one of the similarly disposed electric valves, the so-called "positive ion current" will flow in the excitation circuit 13 due to the ionized condition of the medium in electric valve 4 and due to the negative biasing potential. The effect of this "positive ion current" is to reduce the charge upon the capacitance 33 and to thereby reduce the negative biasing potential. This "positive ion current" tends to neutralize the negative charge on the left-hand plate of capacitance 33 by flowing through the impedance element 35 or by flowing through the circuit in parallel with the impedance element 35 including the serially-arranged impedance element 37 and secondary winding 27.

By choosing the proper value for the impedance element 37 and resistance 35 it will be understood that the "positive ion current" may be maintained within a predetermined range of values and since the unidirectional conducting device 36 is connected in parallel with this impedance element, the normal control member current is provided with a relatively low impedance path. If it be assumed that the unidirectional conducting device 36 becomes subjected to an open circuit condition, it becomes necessary for the normal control member current to flow through a circuit of greater impedance. Under this condition, the normal control member current will be required to flow through the non-inductive circuit connected in parallel with the unidirectional conducting device 36. In the prior art arrangements where unidirectional conducting devices have been employed to provide the above-mentioned advantages, when the unidirectional conducting device failed it became essential for the normal control member current to flow through a highly inductive circuit, preventing the excitation circuit from rendering the electric valve 4 conductive. It is to be noted that even though the unidirectional conducting device 36 becomes inoperative, the excitation circuits shown in the figure of the drawing will operate to render the valves conductive during the proper intervals and will also maintain a suitable negative biasing potential, making it possible to repair the excitation circuit or replace the inoperative part without involving an interruption of service.

The non-linear impedance 34 connected in parallel with the capacitance 33 functions to control the maximum value of the negative biasing potential existing in the control circuit 13 by virtue of the negative non-linear impedance-current characteristic. When the unidirectional conducting device 36 is operating properly, it will be understood that the magnitude of the current which flows in the excitation circuit will be substantially greater than the current which flows when the unidirectional conducting device is subjected to an open circuit condition. To maintain a reasonable range of values of negative biasing potential, the value of the non-linear impedance 34 is chosen to limit the negative biasing potential under normal operation.

That is, during normal operation the non-linear impedance element 34 provides a relatively low impedance path for the normal control member current and effects control of the potential difference existing between the plates of the capacitance 33. However, when the unidirectional conducting device 36 is subjected to an open circuit condition the magnitude of the normal control current is decreased, tending to effect thereby a decrease in the negative biasing potential established by capacitance 33. Due to the non-linearity of the impedance-current characteristic of the impedance element 34, this element will provide a relatively high impedance path and the net or resultant negative biasing potential acting in the excitation circuit will remain substantially unaltered. In this manner, I provide a control or excitation circuit for electric valve means which affords positive and reliable control of an electric valve means when the electric valve means is subjected to adverse operating conditions and I also provide an excitation circuit which maintains this positive control even though one of the elements of the excitation circuit becomes inoperative.

Referring now to Fig. 2 of the accompanying drawing, I have diagrammatically represented a modified and simplified excitation circuit applied to an electric valve. The arrangement of Fig. 2 is somewhat similar to the arrangement of Fig. 1 and corresponding elements have been assigned like reference numerals. The arrangement of Fig. 2 shows an excitation circuit for an electric valve whereby the negative biasing voltage may be maintained within a predetermined range of values or within predetermined limits to minimize the variation in the negative biasing voltage and whereby the excitation circuit will maintain control of the associated electric valve under certain types of failures in the excitation circuit. The excitation circuit 40 of Fig. 2 is energized from a suitable source of alternating potential preferably from a peaking transformer 41. Connected in series relation with the parallel connected unidirectional conducting device 36 and the resistance 37, I employ an impedance element, such as a resistance 42, to limit the current in the excitation circuit 40 in the event the unidirectional conducting device 36 arcs back while the electric valve 4 is conductive.

The general principles of operation of the embodiment of my invention diagrammatically shown in Fig. 2 are similar to the principles of operation described above in connection with Fig. 1. Positive potentials will be impressed on control member 12 of electric valve 4 through the unidirectional conducting device 36 and the resistance 42 to render electric valve 4 conductive. In the event the unidirectional conducting device 36 becomes subjected to an open circuit condition, the positive potentials will be impressed on control member 12 through resistances 37 and 42. It will be understood by those skilled in the art that if the electric valve 4 is of the type employing an ionizable medium, such as a gas or vapor, during the conducting period the medium within the electric valve is highly ionized and if the unidirectional conducting device 36 conducts current in the reverse direction a "positive ion current" will flow in the excitation circuit tending to reduce the negative biasing potential established by the capacitance 33 and the parallel connected resistance 34. By virtue of this arrangement, it is apparent that the excitation circuit will function to supply a suitable excitation current to control member 12 of electric valve 4 when the unidirectional conducting device 36 is subjected to an open circuit condition, and the resistance 42 will limit the "positive ion current" if the unidirectional conducting device 36 experiences an arc-back condition.

A further desirable feature of the above-described excitation circuits is the relatively large current carrying capacity of these circuits. The non-linear element 34 not only affords a means for controlling the excitation circuit to maintain the desired negative biasing potential, but this element is also capable of carrying a relatively large current incident to the control of electric valve means used in power applications.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an electric valve means having a control member, and an excitation circuit for energizing said control member comprising a source of alternating potential, means connected in series relation with said control member and said source and arranged to be energized from said source for impressing a negative biasing potential on said control member, a unidirectional conducting device connected in series relation with said source, said means and said control member and a symmetrically conductive non-inductive impedance element connected across said unidirectional conducting device.

2. In combination, an electric valve means having a control member and employing an ionizable medium, and an excitation circuit for controlling said electric valve means comprising a source of alternating potential, means connected in series relation with said control member and said source and arranged to be energized from said source for impressing a negative biasing potential on said control member and means connected in series relation with said source, said means and said control member including a parallel-connected unidirectional conducting device and a symmetrically conductive non-inductive resistance for providing a low impedance path for normal control member current and for providing a high impedance path for the current incident to the deionization of said medium.

3. In combination, an electric valve means having a control member, and a control circuit for energizing said control member comprising a source of alternating potential, means connected in series with said control member and arranged to be energized from said source for impressing on said control member a negative biasing potential and an impedance element having a non-linear impedance-current characteristic and being connected across said means for limiting said negative biasing potential to a predetermined maximum value.

4. In combination, an electric valve means having a control member, and a control circuit for energizing said control member comprising a source of alternating potential, means including a capacitance connected in series with said control member and being arranged to be energized periodically from said source for impressing on said control member a negative biasing potential and an impedance element having a non-linear impedance-current characteristic and being connected across said capacitance for minimizing the variations in said negative biasing potential.

5. In combination, an electric valve means having a control member, and a control circuit for energizing said control member comprising a source of alternating potential, means including a capacitance connected in series relation with said control member and arranged to be energized from said source for impressing on said control member a negative biasing potential and means for maintaining said negative biasing potential within a predetermined range of values including a resistance connected in series relation with said capacitance and said control member and an impedance element having a non-linear impedance-current characteristic connected across said capacitance.

6. In combination, an electric valve means having a control member, and a circuit for energizing said control member comprising a source of alternating potential, means including a capacitance connected in series relation with said control member for impressing on said control member a negative biasing potential, a device having unidirectional conducting characteristics connected in series relation with said capacitance and control member for permitting the flow of normal control member current to charge said capacitance and an impedance element having a non-linear impedance-current characteristic connected across said capacitance for limiting said negative biasing potential to a predetermined maximum value.

7. In combination, an electric valve means having a control member, and an excitation circuit for energizing said control member comprising a source of alternating potential, a unidirectional conducting device, a capacitance connected in series relation with said control member and said unidirectional conducting device and arranged to be energized from said source for impressing a negative biasing potential on said control member and a non-inductive impedance element connected across said unidirectional conducting device to provide a path for the normal control member current in the event said unidirectional conducting device becomes inoperative.

8. In combination, an electric valve means having a control member, and an excitation circuit for energizing said control member comprising a source of alternating potential, a unidirectional conducting device, a capacitance connected in series relation with said control member and said unidirectional conducting device and arranged to be energized from said source for impressing a negative biasing potential on said control member, a non-inductive impedance element connected across said unidirectional conducting device and a resistance having a non-linear impedance-current characteristic connected in parallel with said capacitance for controlling said negative biasing potential, said impedance being proportioned to limit the maximum value of said negative biasing potential by providing a relatively low impedance path when said unidirectional conducting device is operative and for providing a relatively high impedance path when the larger portion of the normal control member current is conductive through said non-inductive impedance element.

9. In combination, an electric valve means employing an ionizable medium and having a control member, and an excitation circuit for energizing said control member comprising a source of alternating potential, means connected in series relation with said control member and arranged to be energized from said source for impressing a negative biasing potential on said control member, a parallel connected unidirectional conducting device and a non-inductive impedance element connected in series relation with said source and an impedance element connected in series relation with said parallel connected unidirectional conducting device and said non-inductive impedance element to limit the current in said excitation circuit in the event said unidirectional conducting device is subjected to an arc-back condition.

BURNICE D. BEDFORD.